Dec. 29, 1925.

C. B. SPALSBURY 1,567,873

SMOOTHING, STRETCHING, AND SHAPING MACHINE

Filed Jan. 9, 1924

Inventor:
Charles B. Spalsbury,
by Rippey Kingsland
His Attorneys.

Patented Dec. 29, 1925.

1,567,873

UNITED STATES PATENT OFFICE.

CHARLES B. SPALSBURY, OF ST. LOUIS, MISSOURI, ASSIGNOR TO JOHNSON, STEPHENS AND SHINKLE SHOE COMPANY, OF ST. LOUIS, MISSOURI, A CORPORATION OF MISSOURI.

SMOOTHING, STRETCHING, AND SHAPING MACHINE.

Application filed January 9, 1924. Serial No. 685,116.

*To all whom it may concern:*

Be it known that I, CHARLES B. SPALSBURY, a citizen of the United States, residing at St. Louis, Missouri, have invented a new and useful Smoothing, Stretching, and Shaping Machine, of which the following is a specification.

This invention relates to a machine for smoothing, stretching and shaping materials, such, for instance, as the facings or covers of various articles.

An object of the invention is to provide a machine adapted for use in smoothing, stretching and shaping the facing or cover applied to any article so the the operation of applying the facing or cover may be accomplished with facility and speed and thereby reducing the expense of the operation.

Another and a specific object of the invention is to provide a machine specially adapted for smoothing, stretching and shaping the facing or cover applied to the breast of a shoe heel and to the shoe sole, so that the operation of applying the facing or cover may be facilitated and the expense reduced.

Figure 1:
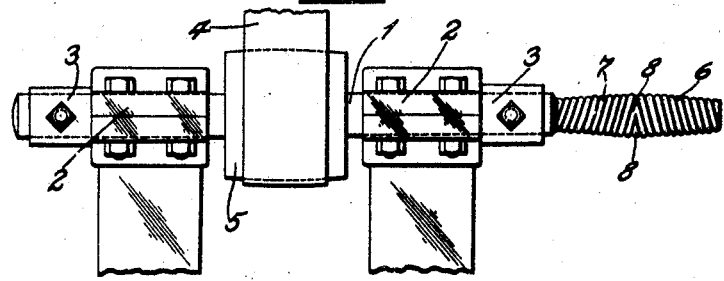

Other objects will appear from the following description, reference being made to the drawings, in which Fig. 1 is a side elevation of one form of the invention.

Figure 2:
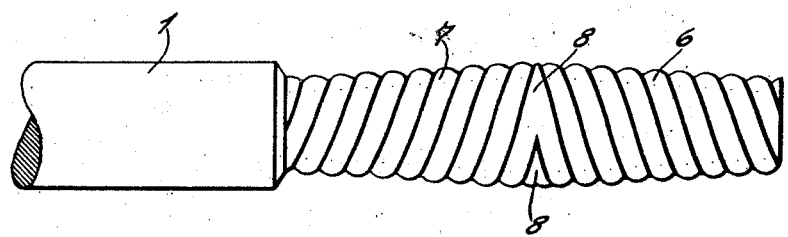

Fig. 2 is an enlarged side elevation thereof more clearly disclosing the novel formation and relationship of the parts in one of the many variations of which the invention is capable.

Heretofore the practice of securing the facing or cover to the breast of a shoe heel and to the shoe sole has been more or less tedious and expensive, due partially to the fact that such operations were essentially performed largely by hand and considerable care was required to apply the facing or cover to the shoe heel and sole without the presence of wrinkles or creases. The present invention comprises a device for smoothing, stretching and shaping the facings or covers of various articles, and a description of the invention and its use for smoothing, stretching and shaping the facing or cover of one such article is sufficient for all purposes. The device accomplishes this desirable result, irrespective of whether the article having the facing or cover is concave in cross section or not, and irrespective of whether adjacent portions are of different cross sectional contour or not. The invention is equally useful for the purposes for which it is intended irrespective of the specific surface contour of adjacent portions of the surface of the article.

In the embodiment of the invention shown a shaft 1 is journaled for rotation in spaced bearings 2 in which it is held from axial movement by any appropriate means, as by collars 3. The shaft 1 may be rotated by a belt 4 engaging a pulley 5 on the shaft 1, or by other appropriate operating mechanism as desired.

The smoothing, stretching and shaping device is supported by the shaft 1 and, if desired, may be made an integral part thereof as shown. The form of the invention chosen for purpose of illustration and which may be widely varied, comprises suitably shaped convolutions 6. If desired corresponding oppositely winding convolutions 7 may be provided, although in many uses of the invention a single series of convolutions are sufficient. The convolutions 6 and 7 have terminals 8 which, if desired, may merge as shown, though this is unessential.

In using the device to smooth, stretch and shape the facing or cover of an article, as for instance, the facing or cover of a shoe sole and the breast of the heel, the shaft 1 is rotated in a direction in which the terminals 8 of the convolutions are turned forwardly with respect to the direction of rotation of the shaft. The shoe is then held so that the forwardly turning terminals 8 operate against the facing or cover of the sole and the breast of the heel about midway between the side edges thereof, thereby pressing the facing or cover into the depression or concavity in the breast of the heel, if the heel be of such formation; and at the same time the convolutions 6 and 7 spread or smooth the facing or cover toward opposite side edges of the heel and sole, thus smoothing, stretching and shaping the facing or cover and causing it to adhere smoothly to the heel and sole irrespective of the surface formation thereof.

While I have chosen to illustrate one of the many embodiments of which the invention is capable with a mediate portion of larger diameter than the end portions, thus adapting this form of the invention specially for use in work upon an article having a concavity or depression in its surface, it will, of course, be understood that the scope of the invention is not so restricted, for the shape and form of the smoothing and stretching device comprising the convolutions may be varied as desired. I do not restrict myself in these or other unessential particulars, but contemplate such variations as may be useful in obtaining the best results in the use of the device upon different classes of work.

What I claim and desire to secure by Letters Patent is:—

1. A device of the character described comprising two series of oppositely formed spiral convolutions of equal and uniform pitch throughout their length and having their adjacent ends merging into approximately V-shaped terminals and each series tapering away from the adjacent end of the other series.

2. A device of the character described comprising a shaft, means for rotating said shaft, and a smoothing stretching and shaping device rotated by said shaft and comprising two series of oppositely formed spiral convolutions of equal and uniform pitch throughout their length and having their adjacent ends merging into approximately V-shaped terminals, and each series tapering away from the adjacent end of the other series.

CHARLES B. SPALSBURY.